United States Patent
Yu (10) Patent No.: US 10,632,480 B2
(45) Date of Patent: Apr. 28, 2020

(54) ADJUSTABLE SHOWER DEVICE

(71) Applicant: XIAMEN PRIME SHOWER CO., LTD., Xiamen, Fujian (CN)

(72) Inventor: Qin Yu, Xiamen (CN)

(73) Assignee: XIAMEN PRIME SHOWER CO., LTD., Xiamen, Fujian (CN)

( * ) Notice: Subject to any disclaimer, the term of this patent is extended or adjusted under 35 U.S.C. 154(b) by 9 days.

(21) Appl. No.: 16/030,848

(22) Filed: Jul. 9, 2018

(65) Prior Publication Data

US 2019/0366356 A1 Dec. 5, 2019

(30) Foreign Application Priority Data

May 30, 2018 (CN) .................... 2018 2 0826224 U (51) Int. Cl.
| | |
|---|---|
| *B05B 1/18* | (2006.01) |
| *B05B 1/30* | (2006.01) |
| *E03C 1/06* | (2006.01) |
| *E03C 1/04* | (2006.01) |

(52) U.S. Cl.
CPC ................ *B05B 1/18* (2013.01); *B05B 1/30* (2013.01); *E03C 1/06* (2013.01); *E03C 1/0409* (2013.01)

(58) Field of Classification Search
None
See application file for complete search history.

(56) References Cited

U.S. PATENT DOCUMENTS

| | | | | |
|---|---|---|---|---|
| 4,752,975 A | * | 6/1988 | Yates | ........................ E03C 1/06 239/207 |
| 6,227,456 B1 | * | 5/2001 | Colman | ................. E03C 1/0404 239/1 |
| 7,066,411 B2 | * | 6/2006 | Male | ....................... E03C 1/021 239/587.1 |
| 7,458,112 B1 | * | 12/2008 | Yang | ..................... E03C 1/0408 137/625.47 |
| 9,585,526 B2 | * | 3/2017 | Zhang | ................. F16K 31/1245 |
| 2004/0199993 A1 | * | 10/2004 | Bui | ........................ E03C 1/0408 4/567 |
| 2009/0289129 A1 | * | 11/2009 | Qiu | ........................ B05B 1/1618 239/550 |
| 2010/0180376 A1 | * | 7/2010 | Deng | .................... E03C 1/0408 4/695 |

\* cited by examiner

*Primary Examiner* — John Fox
(74) *Attorney, Agent, or Firm* — Leong C. Lei (57) ABSTRACT

An adjustable shower device includes a water diversion valve body, a water inlet pipe, and more than one water outlet pipe. The water diversion valve body has a water inlet and more than one water outlet. The water inlet pipe is fixedly connected to the water inlet of the water diversion valve body. An inlet end of the more than one water outlet pipe is connected to the more than one water outlet. Because the water outlet pipe is a universal pipe that is a bendable metal shaping hose, the shower head on the water pipe can be swung to any height, which is more convenient for use.

4 Claims, 9 Drawing Sheets

ADJUSTABLE SHOWER DEVICE

BACKGROUND OF THE INVENTION

1. Field of the Invention

The present invention relates to a shower apparatus, and more particularly to an adjustable shower device.

2. Description of the Prior Art

In North America, a wall-mounted water outlet pipe is often set at a height of 1.7 m above the ground. The water outlet pipe is connected with a shower head or a handheld shower head for people to take a shower. However, it is not possible to simultaneously meet the shower needs of different individuals with an external shower head and a handheld shower head. Therefore, the industry developed a "multifunctional water diversion valve body". As disclosed in Chinese Patent Publication No. CN2787975, based on the original water diversion valve body, a socket for placing a hand-held shower head is added. The water inlet of the water diversion valve body is connected to the water outlet of the water outlet pipe. The shower head and the handheld shower head are connected to the first water outlet and the second water outlet of the water diversion valve body, respectively. The water diversion valve body is provided with a switching handle for the water inlet of the water diversion valve body selectively communicates with the first water outlet or the second water outlet so as to realize the technical solution that the water outlet pipe is connected with the external shower head and the handheld shower head simultaneously. The water diversion valve body is provided with a socket for insertion of the handheld shower head. There is no need to drill holes for installing a shower bracket or a shower rod on the wall, which is convenient for installation. However, since the socket is disposed on the extension section of the circular housing of the water diversion valve body, the installation space is limited. The holding portion of the socket is fixedly arranged, which inevitably leads to a short gap between the socket and the holding portion, and only the connecting portion of the handheld shower head and the hose can be retained. The center of gravity of the shower head is generally located in the upper part of the handle, so that when the connecting portion of the handheld shower head is inserted on the socket, the shower head is easily deflected downward due to the effect of gravity. Besides, due to the gap distance between the socket and the holding portion, it is impossible to retain a shower head that is large in size.

Accordingly, the inventor of the present invention has devoted himself based on his many years of practical experiences to solve these problems.

SUMMARY OF THE INVENTION

The primary object of the present invention is to provide an adjustable shower device with high applicability and convenient use.

In order to achieve the above object, the adjustable shower device of the present invention comprises a water diversion valve body, a water inlet pipe, and more than one water outlet pipe. The water diversion valve body has a water inlet and more than one water outlet. The water inlet pipe is fixedly connected to the water inlet of the water diversion valve body. An inlet end of the more than one water outlet pipe is connected to the more than one water outlet. The water outlet pipe is a non-bendable metal pipe or a bendable universal pipe or shower hose.

Preferably, the water outlet pipe is composed of a first water outlet pipe and a second water outlet pipe. The water diversion valve body has a water inlet and two water outlets. An inlet end of the first water outlet pipe is connected to one of the water outlets of the water diversion valve body. An inlet end of the second water outlet pipe is connected to the other water outlet of the water diversion valve body. The first water outlet pipe is a non-bendable metal pipe or a bendable universal pipe. The second water outlet pipe is a bendable universal pipe or shower hose.

Preferably, an outlet end of the second water outlet pipe is connected to a pipe joint. The pipe joint has a socket for receiving a handheld shower head. The pipe joint has a water passage therein and is connected with a hose.

Alternatively, an outlet end of the second water outlet pipe is connected to a hose. The outlet end of the second water outlet pipe is engaged with a socket.

Preferably, an outlet end of the first water outlet pipe is connected to a shower head.

Preferably, a pipe body of the universal pipe is a stainless steel stripwound hose. The pipe body has a water channel therein. Two ends of the pipe body are connected with connecters each having an inner screw thread or an outer screw thread. An exterior of the stainless steel stripwound hose is wrapped with an outer pipe formed of silicone.

By adopting the above solution, the present invention includes a water diversion valve body, a water inlet pipe, a first water outlet pipe and a second water outlet pipe. The first water outlet pipe and the second water outlet pipe may be a universal pipe. The universal pipe is a metal shaping hose, which can be swung to any position. The user can swing the shower head on the first water outlet pipe to a height suitable for the user according to the height of the user. According to the distance between the water distribution valve body and the wall, the pipe joint having the socket on the second water outlet pipe can be swung outward to a position suitable for insertion of the handheld shower head. The present invention makes full use of the feature of the universal pipe that can be freely bent and positioned, which brings great convenience to the user.

DETAILED DESCRIPTION OF THE PREFERRED EMBODIMENTS

Embodiments of the present invention will now be described, by way of example only, with reference to the accompanying drawings.

As shown in FIG. 1 to FIG. 5, an adjustable shower device according to a first embodiment of the present invention comprises a water diversion valve body 1, a water inlet pipe 2, a first water outlet pipe 3, a second water outlet pipe 4, a pipe joint 5, and a shower head 6.

The water diversion valve body 1 is a three-way valve which has a water inlet 11 and two water outlets 12, 13.

The water inlet pipe 2 is fixedly connected to the water inlet 11 of the water diversion valve body 1. An inlet end of the first water outlet pipe 3 is connected to the water outlet 12 facing up of the water diversion valve body 1. An outlet end of the first water outlet pipe 3 is connected to the shower head 6.

Figure 6:
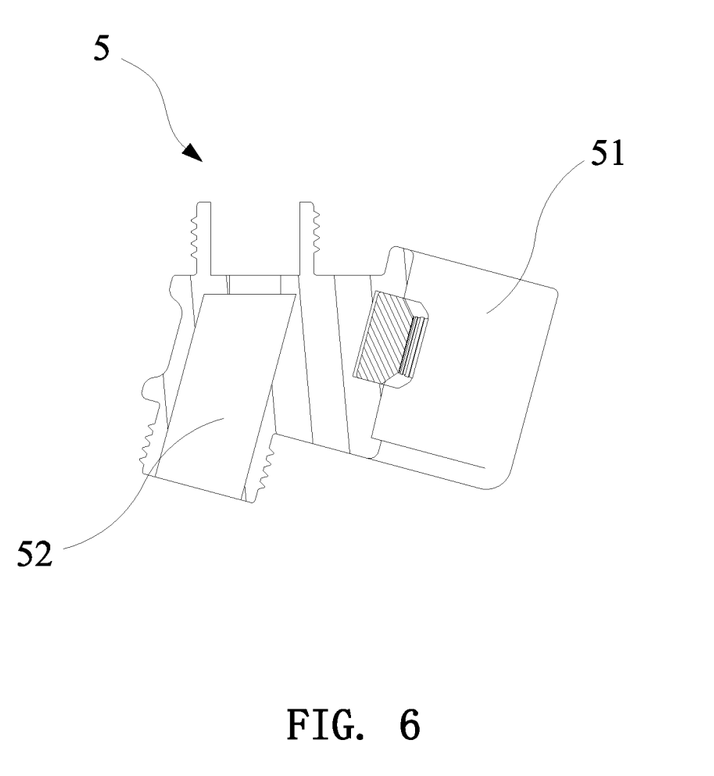
FIG. 6 is a sectional view of the pipe joint in accordance with the first embodiment of the present invention.

In conjunction with FIG. 6, an inlet end of the second water outlet pipe 4 is connected to the water outlet 13 facing down of the water diversion valve body 1. An outlet end of the second water outlet pipe 4 is connected to the pipe joint 5. The pipe joint 5 is provided with a socket 51 for receiving a handheld shower head 10. The pipe joint 5 has a water passage 52 therein. The water passage 52 communicates with the second water outlet pipe 4. The pipe joint 5 may be connected with a hose 7. The pipe joint 5 is connected with the handheld shower head 10 through the hose 7.

The first water outlet pipe 3 and the second water outlet pipe 4 are universal pipes. The universal pipe is a metal shaping hose, which can be bent freely and retained after swinging to any position.

Figure 9:
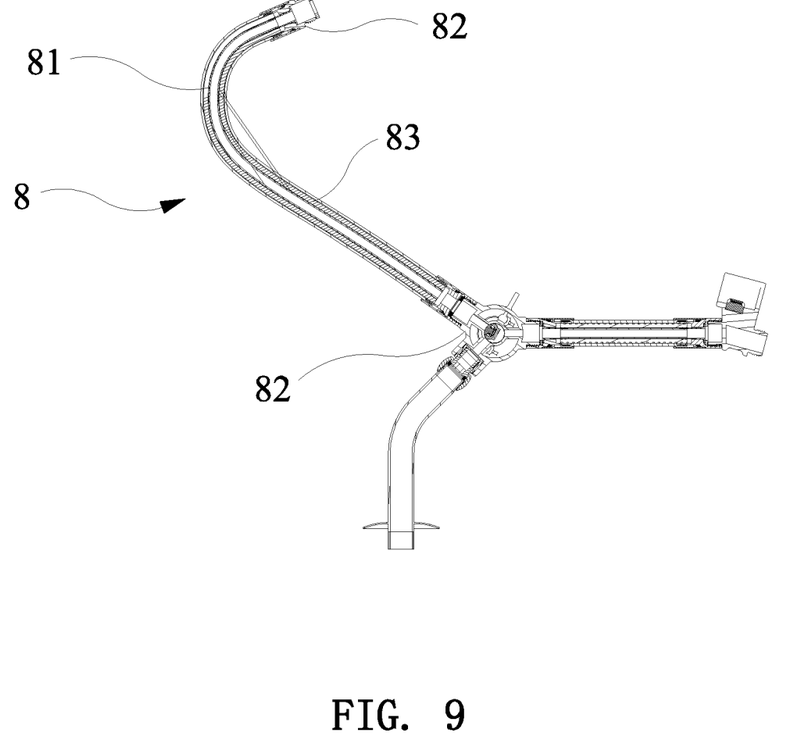
FIG. 9 is a sectional view of the universal pipe of the present invention.

As shown in FIG. 9, a pipe body 81 of the universal pipe 8 is a stainless steel stripwound hose, that is, a stainless steel corrugated pipe. The pipe body has a water channel therein. Two ends of the pipe body are connected with connecters 82 each having an inner screw thread or an outer screw thread. The exterior of the stainless steel corrugated pipe is wrapped with an outer pipe 83 formed of silicone; or it may not be wrapped with the outer tube.

Figure 1:
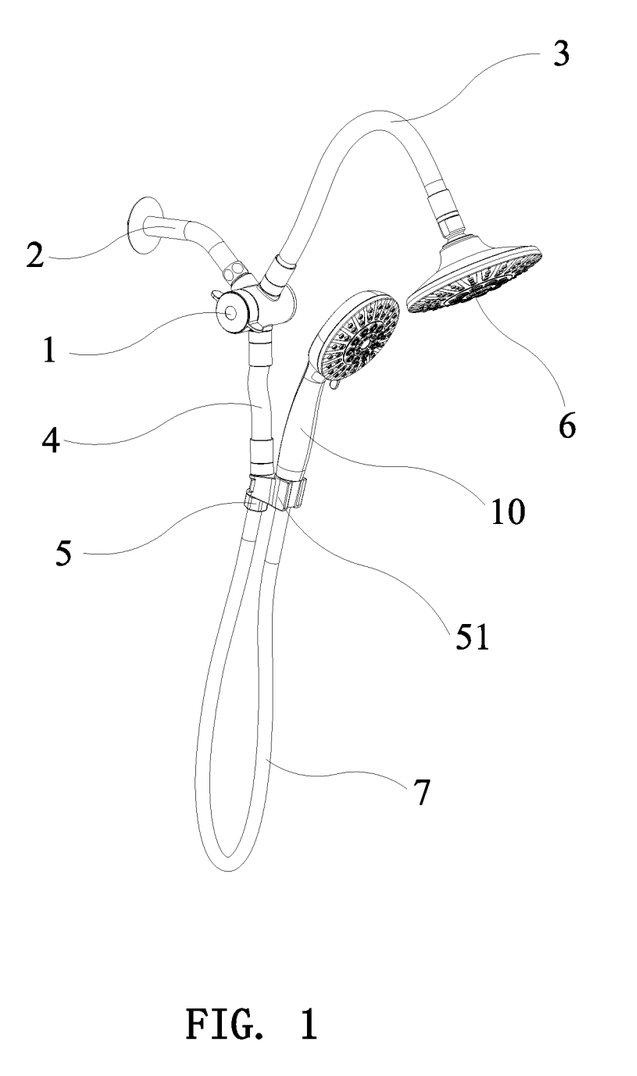
FIG. 1 is a perspective view in accordance with a first embodiment of the present invention.
Figure 2:
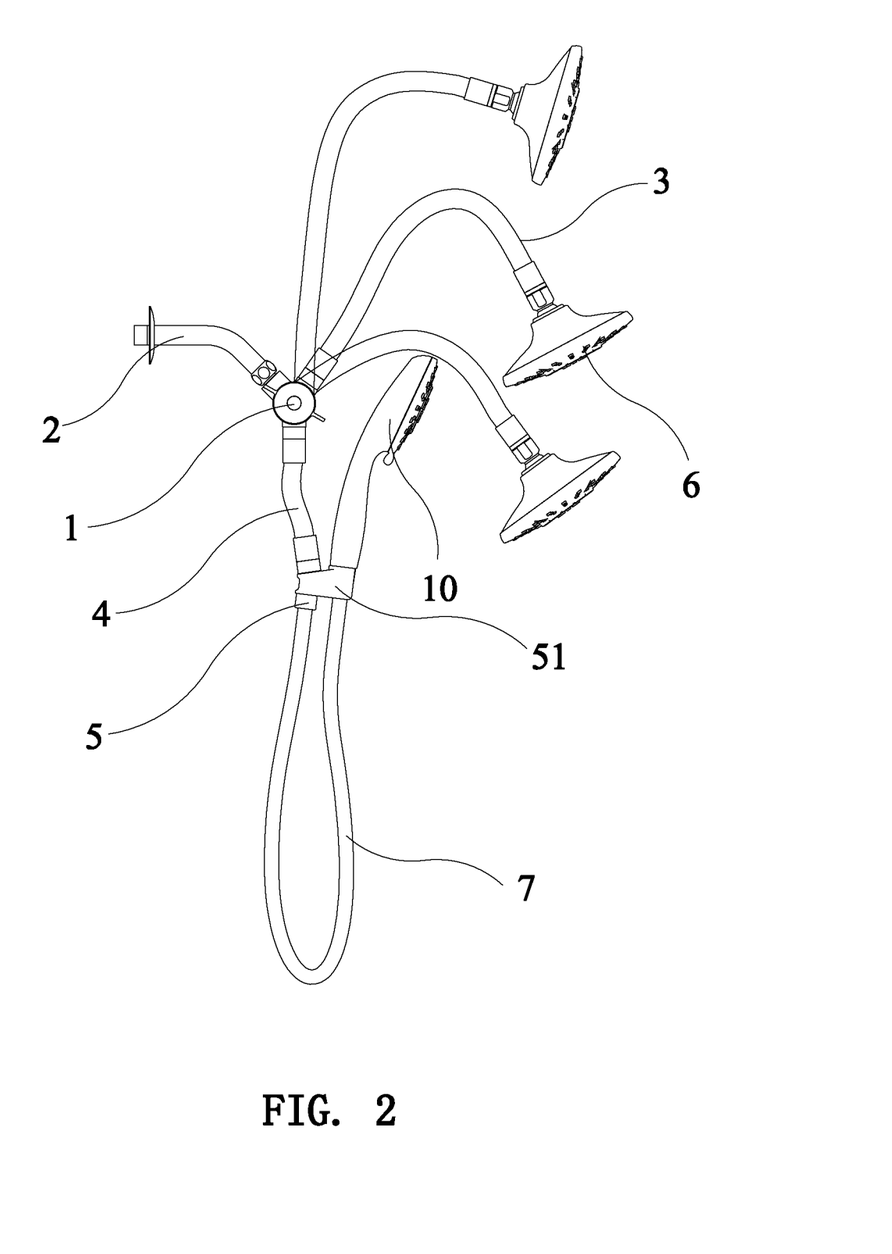
FIG. 2 is a schematic view according to the first embodiment of the present invention, showing the showerhead in different operating states.
Figure 3:
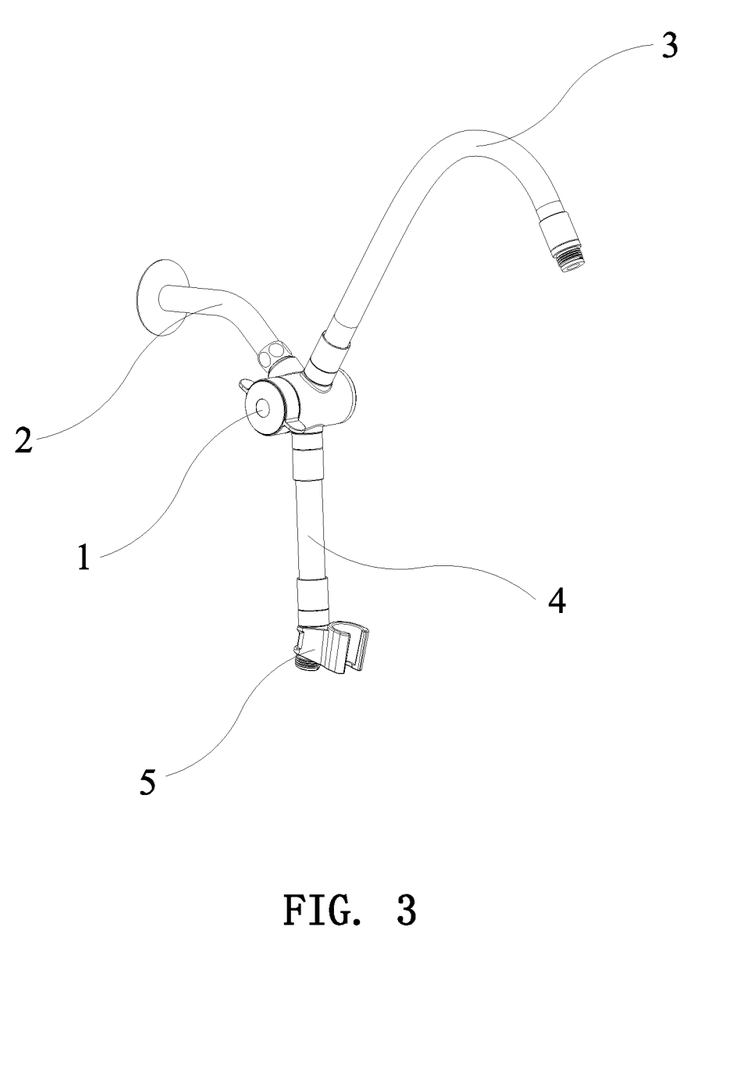
FIG. 3 is a perspective view in accordance with the first embodiment of the present invention, without the shower head.
Figure 4:
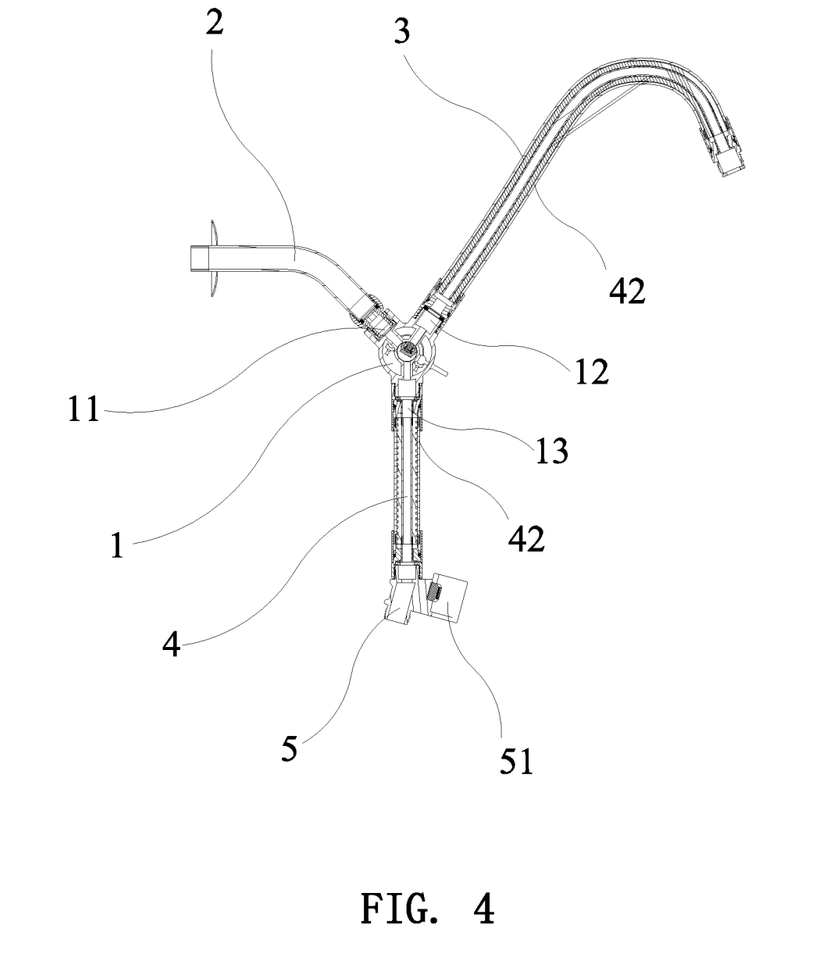
FIG. 4 is a sectional view in accordance with the first embodiment of the present invention, without the shower head.
Figure 5:
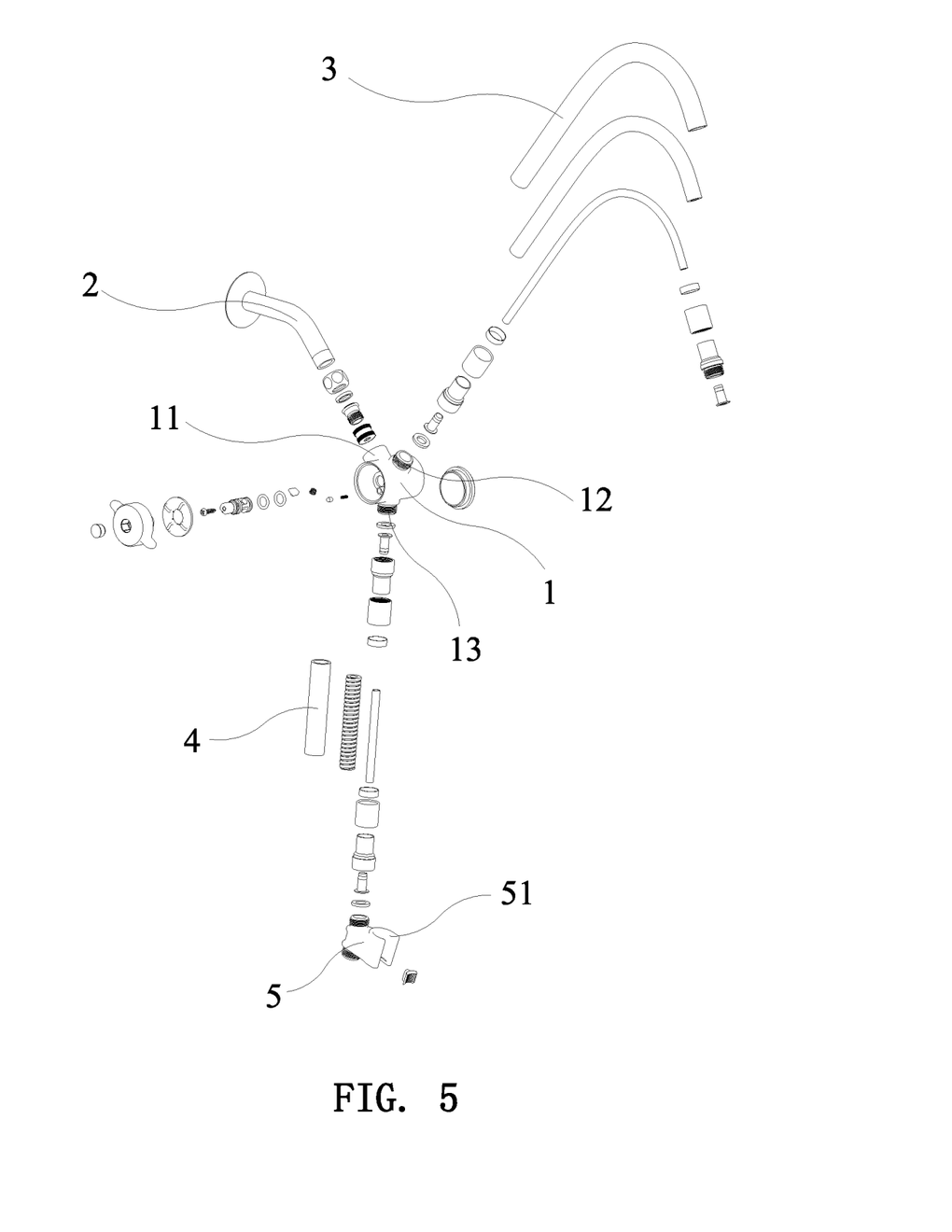
FIG. 5 is an exploded view in accordance with the first embodiment of the present invention, without the shower head.

As shown in FIG. 1, when in use, the user can swing the shower head 6 on the first water outlet pipe 3 to a height suitable for the user according to his/her height. Furthermore, according to the distance between the water distribution valve body 1 and the wall, the pipe joint 5 having the socket on the second water outlet pipe 4 can be swung outward to a position suitable for insertion of the handheld shower head 10.

Figure 7:
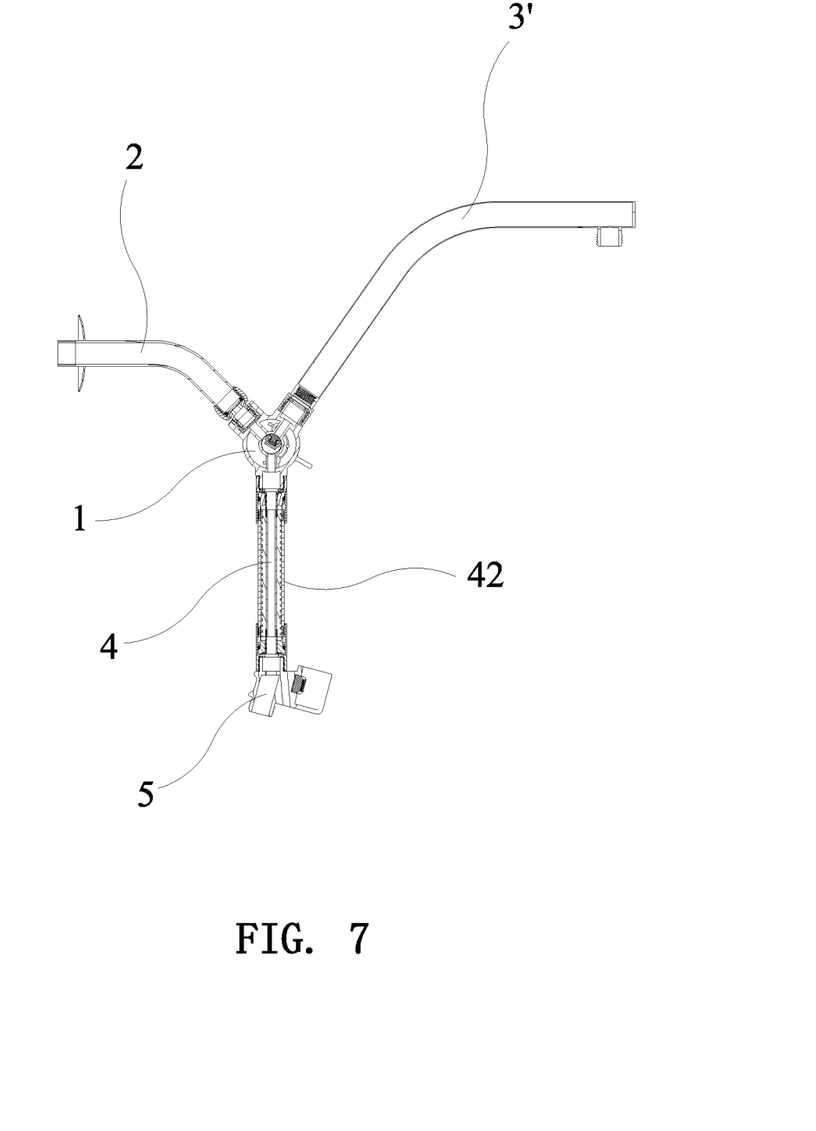
FIG. 7 is a front sectional view in accordance with a second embodiment of the present invention.

As shown in FIG. 7, a second embodiment of the present invention is substantially similar to the first embodiment, comprising a water diversion valve body 1, a water inlet pipe 2, a first water outlet pipe 3', a second water outlet pipe 4, and a pipe joint 5. The difference between the first embodiment and the second embodiment is that the first water outlet pipe 3' is a non-bendable metal pipe.

Figure 8:
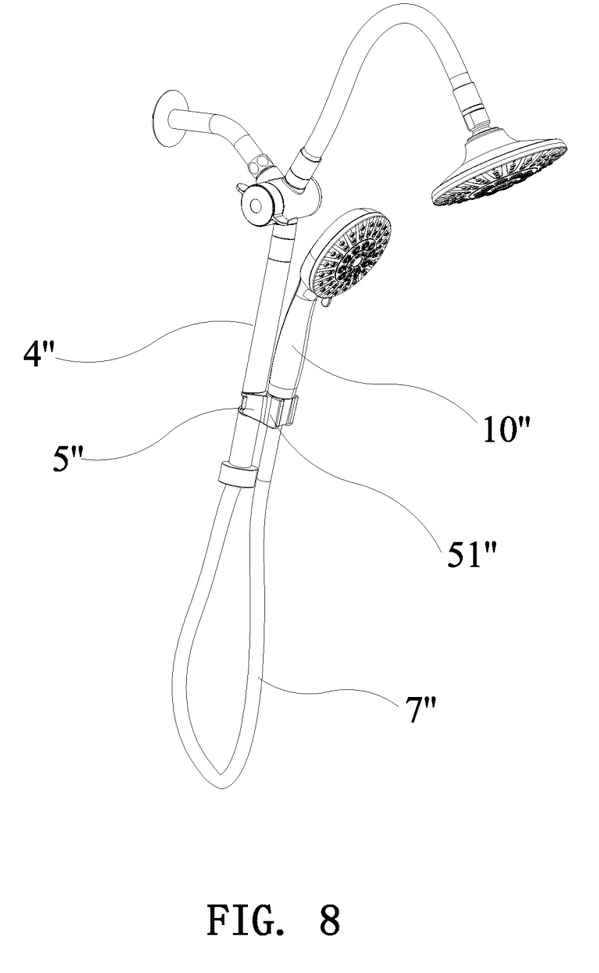
FIG. 8 is a perspective view in accordance with a third embodiment of the present invention.

As shown in FIG. 8, a third embodiment of the present invention is substantially similar to the first embodiment with the exceptions described hereinafter. The outlet end of the second water outlet pipe 4" may be directly connected with the hose 7". The inner end of a socket 5" for insertion of the handheld shower head is directly clamped on the second water outlet pipe 4". The handheld shower head 10 can be inserted in the slot 51 at the outer end of the socket 5".

It should be noted that the structure of the water diversion valve body 1 may have a water inlet 11 and two water outlets 12, 13 as shown in this embodiment, or it may have a water inlet and more than two water outlets.

The main feature of the present invention is that the first water outlet pipe and the second water outlet pipe may be a universal pipe.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. An adjustable shower device, comprising a water diversion valve body, a water inlet pipe and at least one water outlet pipe; the water diversion valve body having a water inlet and at least one water outlet; the water inlet pipe being fixedly connected to the water inlet of the water diversion valve body, an inlet end of the at least one water outlet pipe being connected to the at least one water outlet; the water outlet pipe being a non-bendable metal pipe or a bendable universal pipe or shower hose; wherein a pipe body of the universal pipe is a stainless steel strip wound hose, the pipe body has a water channel therein, two ends of the pipe body are connected with connectors each having an inner screw thread or an outer screw thread, and an exterior of the stainless steel strip wound hose is wrapped with an outer pipe formed of silicone.

2. The adjustable shower device as claimed in claim 1, wherein the water outlet pipe is composed of a first water outlet pipe and a second water outlet pipe; the water diversion valve body has a water inlet and two water outlets; an inlet end of the first water outlet pipe is connected to one of the water outlets of the water diversion valve body, an inlet end of the second water outlet pipe is connected to the other water outlet of the water diversion valve body; the first water outlet pipe is a non-bendable metal pipe or a bendable universal pipe, and the second water outlet pipe is a bendable universal pipe or shower hose.

3. The adjustable shower device as claimed in claim 2, wherein an outlet end of the second water outlet pipe is connected to a pipe joint, the pipe joint has a socket for receiving a handheld shower head, and the pipe joint has a water passage therein and is connected with a hose.

4. The adjustable shower device as claimed in claim 2, wherein an outlet end of the first water outlet pipe is connected to a shower head.

* * * * *